(12) United States Patent
Yang

(10) Patent No.: US 8,974,010 B2
(45) Date of Patent: Mar. 10, 2015

(54) ELECTRIC BRAKE SYSTEM FOR VEHICLES

(71) Applicant: Mando Corporation, Pyungteak-si (KR)

(72) Inventor: I Jin Yang, Seongnam-si (KR)

(73) Assignee: Mando Corporation, Pyeongtaek-Si (KR)

( * ) Notice: Subject to any disclaimer, the term of this patent is extended or adjusted under 35 U.S.C. 154(b) by 15 days.

(21) Appl. No.: 13/763,347

(22) Filed: Feb. 8, 2013

(65) Prior Publication Data

US 2013/0214587 A1    Aug. 22, 2013

(30) Foreign Application Priority Data

Feb. 10, 2012 (KR) ........................ 10-2012-0013501

(51) Int. Cl.
| | |
|---|---|
| *B60T 13/00* | (2006.01) |
| *B60T 13/68* | (2006.01) |
| *B60T 13/74* | (2006.01) |
| *B60T 7/06* | (2006.01) |
| *B60T 8/40* | (2006.01) |

(52) U.S. Cl.
CPC ............. *B60T 13/686* (2013.01); *B60T 13/745* (2013.01); *B60T 7/06* (2013.01); *B60T 8/4018* (2013.01); *B60T 8/4081* (2013.01)
USPC ........................ 303/6.01; 303/15; 303/113.4

(58) Field of Classification Search
USPC ............ 303/6.01, 3, 15, 113.1, 113.4, 114.1, 303/115.1, 119.1; 188/358, 359
See application file for complete search history.

(56) References Cited

U.S. PATENT DOCUMENTS

| | | | | |
|---|---|---|---|---|
| 6,183,049 | B1 * | 2/2001 | Oka et al. ................... | 303/114.1 |
| 6,705,683 | B2 * | 3/2004 | Niepelt et al. ........... | 303/122.13 |
| 6,824,228 | B2 * | 11/2004 | Harris et al. .................. | 303/155 |
| 8,328,298 | B2 * | 12/2012 | Yang et al. ................ | 303/119.1 |
| 8,447,487 | B2 * | 5/2013 | Nishino et al. .................. | 701/78 |
| 2011/0006594 | A1 * | 1/2011 | Ganzel ........................... | 303/10 |

FOREIGN PATENT DOCUMENTS

| | | |
|---|---|---|
| JP | 2011-073535 | 4/2011 |
| KR | 10-2011-0011938 | 2/2011 |
| KR | 10-1090910 | 12/2011 |

OTHER PUBLICATIONS

Office action dated Jun. 26, 2013 from corresponding Korean Patent Application No. 10-2012-0013501 and its English translation by Google Translate.

* cited by examiner

*Primary Examiner* — Pamela Rodriguez
(74) *Attorney, Agent, or Firm* — Ladas & Parry, LLP

(57) ABSTRACT

The electric brake system for vehicles includes a pressure supplier connected to a reservoir through a hydraulic passage to receive the oil, the pressure supplier outputting a brake will of a driver as an electric signal through the pedal displacement sensor, when the driver pushes the brake pedal, to operate a motor and convert a rotational force of the motor into linear motion, a hydraulic control unit including a first circuit including at least one first vehicle wheel and a second circuit including at least one second vehicle wheel to receive a hydraulic pressure with a force generated by the pressure supplier and thereby perform braking, a blocking valve to control the hydraulic pressure from the master cylinder to a wheel cylinder disposed in each vehicle wheel, a simulation device connected to the master cylinder, to provide a reaction force response to the pedal effort of the brake pedal, and an electronic control unit to control the motor and the valves, based on pressure information and pedal displacement information.

21 Claims, 3 Drawing Sheets

ELECTRIC BRAKE SYSTEM FOR VEHICLES

CROSS-REFERENCE TO RELATED APPLICATION(S)

This application claims the benefit of Korean Patent Application No. 2012-0013501, filed on Feb. 10, 2012 in the Korean Intellectual Property Office, the disclosure of which is incorporated herein by reference.

BACKGROUND

1. Field

Embodiments of the present invention relate to an electric brake system for vehicles having a simple configuration, providing a stable pedal feel during braking and enabling accurate pressure control.

2. Description of the Related Art

Brake systems are necessarily mounted in vehicles. In recent years, a variety of systems to obtain stronger and more stable braking force have been suggested. Examples of brake systems include anti-lock brake systems (ABSs) to prevent slippage of wheels during braking, brake traction control systems (BTCSs) to prevent slippage of driving wheels during sudden acceleration of vehicles, and vehicle dynamic control systems (VDCs) to stably maintain a driving state of vehicles by controlling a brake hydraulic pressure through a combination of an anti-lock brake system with a brake traction control system.

These electronically-controlled brake systems include a plurality of solenoid valves to control a brake hydraulic pressure transferred to the hydraulic brake mounted on the wheel of vehicles, a pair of a low-pressure accumulator and a high-pressure accumulator to temporarily store oil escaped from the hydraulic brake, a motor and a pump to forcibly pump the oil of the low-pressure accumulator, a plurality of check valves to prevent reverse flow of the oil, and an ECU to control driving of the solenoid valve and the motor. These components are compactly present in hydraulic blocks made of aluminum.

FIG. 1 is a sectional view illustrating a check valve used for a conventional electronically controlled brake system. For example, the check valve mounted in a passage between a suction part of the pump and the low-pressure accumulator prevents transfer of oil from a master cylinder to the low-pressure accumulator and prevents transfer of oil from a wheel cylinder to the suction part of the pump during operation of the pump by motor driving.

A structure of this brake system is disclosed in Korean Patent No. 1090910. According to the patent document, the brake system fills a high-pressure and/or low-pressure accumulator with a hydraulic pressure by operating a motor and a pump, and increases, decreases, maintains or controls the hydraulic pressure by opening and closing an electronic solenoid valve, thus disadvantageously having a complicated structure.

In addition, since a predetermined gap is present between an input load to pressurize a master cylinder according to a pedal effort of a brake pedal, and the master cylinder, a pedal stroke free region corresponding to the gap during non-operation of a system is formed, a driver disadvantageously has no braking feel, driver convenience suffers and safety issues may arise. In addition, pedal feel is disadvantageously deteriorated.

RELATED ART DOCUMENT

Patent document (Patent Document 1) Korean Patent No. 1090910 (Dec. 1, 2011)

SUMMARY

Therefore, it is one aspect of the present invention to provide an electric brake system for vehicles having a simple configuration, providing a stable pedal feel during braking and enabling accurate pressure control.

It is another aspect of the present invention to provide an electric brake system for vehicles that enables braking through a pedal effort of a driver, although the brake system abnormally operates, and direct formation of pressure without a stroke-free region according to the pedal effort of the brake pedal.

Additional aspects of the invention will be set forth in part in the description which follows and, in part, will be obvious from the description, or may be learned by practice of the invention.

In accordance with one aspect of the present invention, an electric brake system for vehicles, which includes a reservoir to store an oil, a master cylinder having two hydraulic circuits to generate a hydraulic pressure using the oil stored in the reservoir, an input load contacting the master cylinder and being disposed to move forward by a pedal effort of a driver, and a pedal displacement sensor to sense displacement of a brake pedal connected to the input load, further includes a pressure supplier connected to a reservoir through a hydraulic passage to receive the oil, the pressure supplier outputting a brake will of a driver as an electric signal through the pedal displacement sensor, when the driver puts the brake pedal, to operate a motor and convert a rotational force of the motor into linear motion, a hydraulic control unit comprising a first circuit including at least one first vehicle wheel and a second circuit including at least one second vehicle wheel to receive a hydraulic pressure with a force generated by the pressure supplier and thereby perform braking, a blocking valve to control the hydraulic pressure from the master cylinder to a wheel cylinder disposed in each vehicle wheel, a simulation device connected to the master cylinder, to provide a reaction force response to the pedal effort of the brake pedal, and an electronic control unit to control the motor and the valves, based on pressure information and pedal displacement information.

The pressure supplier may include a pressure chamber connected to the hydraulic passage to receive the oil, a hydraulic piston provided in the pressure chamber, a hydraulic spring provided in the pressure chamber to elastically support the hydraulic piston, a motor to generate a rotational force by an electric signal of the pedal displacement sensor, and a ball-screw member including a screw and a ball nut to convert rotational motion of the motor into linear motion, wherein the hydraulic piston is connected to the linearly moving screw to pressurize the oil present in the pressure chamber through the screw.

The hydraulic passage may include a check valve to prevent reverse flow of the pressure of the pressure chamber, and to enable the oil to be absorbed and stored in the pressure chamber, when the hydraulic piston is returned.

The pressure chamber may include a cut-off hole, and a connection passage to connect the cut-off hole to the hydraulic passage may be provided between the pressure chamber and the hydraulic passage.

The electric brake system may further include a first flow passage to connect the pressure supplier to the first circuit and a second flow passage branching from the first flow passage and being connected to the second circuit and a first conversion valve mounted in the first flow passage to control a hydraulic pressure and a second conversion valve mounted in the second flow passage to control a hydraulic pressure.

Check valves may be disposed in parallel with the first and second conversion valves, respectively.

The first and second conversion valves may be normal close type solenoid valves that are closed in a normal state and open when receive an open signal from the electronic control unit.

The hydraulic control unit may include a normal open type solenoid valve disposed in an upper part of the wheel cylinder to control transfer of the hydraulic pressure to the wheel cylinder, a normal close type solenoid valve disposed in a lower part of the wheel cylinder to control escape of the hydraulic pressure from the wheel cylinder, and a return passage to connect the normal close type solenoid valve to the hydraulic passage.

First and second back-up passages to connect the two hydraulic circuits of the master cylinder to the wheel cylinder may be provided in order to control the oil when the electric brake system for vehicles abnormally operates, and the blocking valve may include a first blocking valve mounted in the first back-up passage to control connection to the master cylinder, and a second blocking valve mounted in the second back-up passage to control connection to the master cylinder.

The first and second blocking valves may be provided as normal open type solenoid valves that are opened in a normal state and close while receiving a close signal from the electronic control unit.

The simulation device may include a simulation chamber to store an oil discharged from the master cylinder, a reaction force piston provided in the simulation chamber, a reaction force spring to elastically support the reaction force piston, and a simulation valve provided in an inlet of the simulation chamber.

The simulation valve may be provided as a normal close type solenoid valve that is closed in a normal state and opens while receiving an open signal from the electronic control unit.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Figure 1:
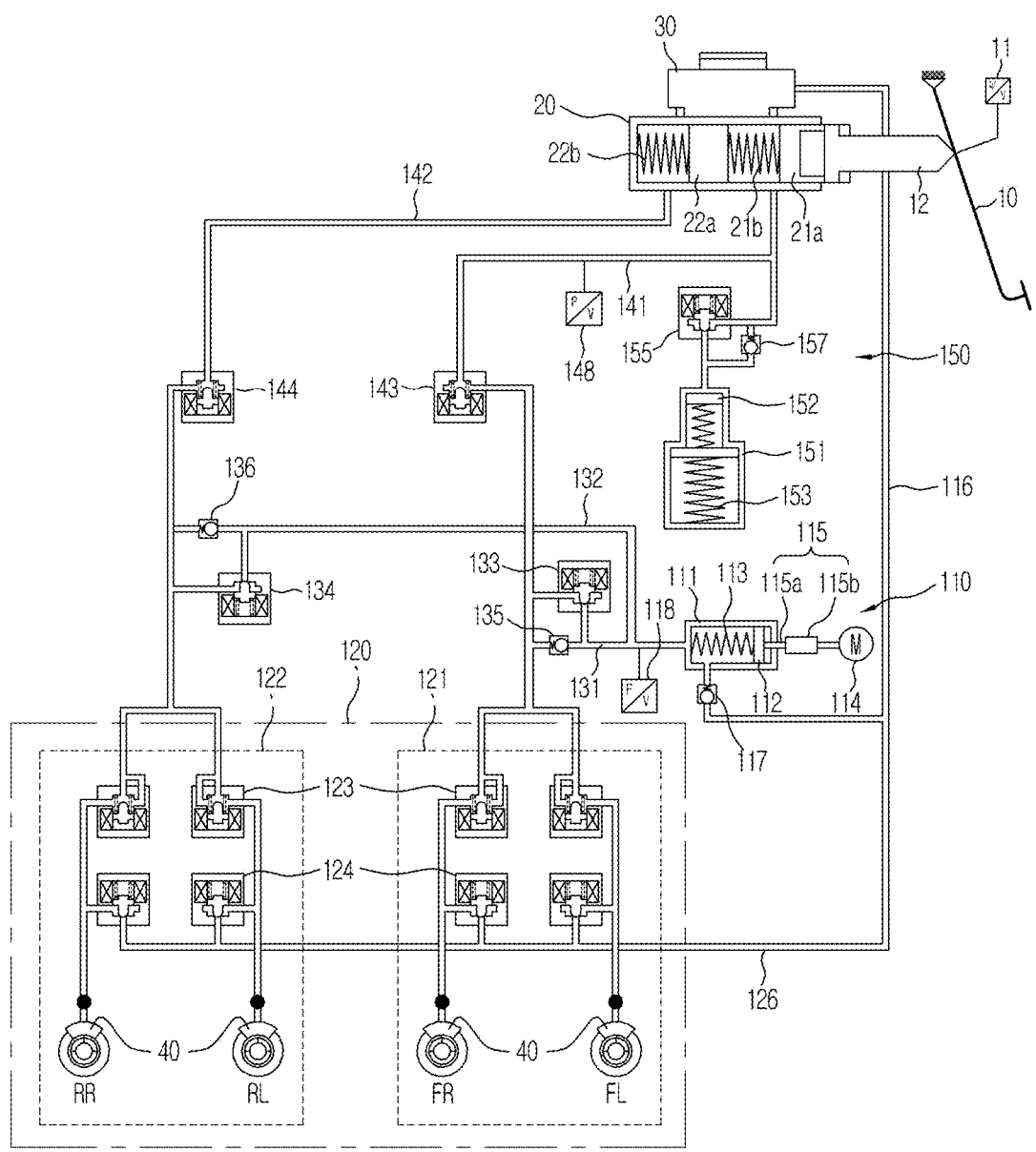
FIG. 1 is a hydraulic circuit view illustrating a non-brake state of an electric brake system for vehicles according to one preferred embodiment of the present invention.

Reference will now be made in detail to the embodiments of the present invention, examples of which are illustrated in the accompanying drawings, wherein like reference numerals refer to like elements throughout.

The terms and words used in the present specification and claims should not be interpreted as being limited to typical meanings or dictionary definitions, but should be interpreted as having meanings and concepts relevant to the technical scope of the present invention based on the rule that an inventor can appropriately define the concepts of the terms to most appropriately describe the best method the inventor knows for carrying out the invention. Therefore, the configurations described in the embodiments and drawings of the present invention are merely most preferable embodiments but do not represent all of the technical spirit of the present invention. Thus, the present invention should be construed as including all the modifications, equivalents, and substitutions included in the spirit and scope of the present invention at the time of filing this application.

FIG. 1 is a hydraulic circuit view illustrating a non-brake state of an electric brake system for vehicles according to a preferred embodiment of the present invention.

Referring to FIG. 1, the electric brake system for vehicles generally includes a master cylinder 20 to generate a hydraulic pressure, a reservoir 30 coupled to a upper part of the master cylinder 20 to store an oil, an input load 12 to pressurize the master cylinder 20 according to a pedal effort of the brake pedal 10, a wheel cylinder 40 to receive the oil from the reservoir 30 and to brake respective vehicle wheels (RR, RL, FR and FL), and a pedal displacement sensor 11 to sense displacement of the brake pedal 10.

The master cylinder 20 includes at least one chamber to generate a hydraulic pressure, but is provided with a first piston 21a and a second piston 22a to form two hydraulic circuits, which contact the input load 12. The master cylinder 20 has two hydraulic circuits in order to secure safety when breaking down. For example, one of the two hydraulic circuits is connected to the front right (FR) wheel and the rear left (RL) wheel, and the other is connected to the front left (FL) wheel and the rear right (RR) wheel. Conversely, generally, one of the two hydraulic circuits is connected to the two (FR and FL) wheels and the other is connected to the two (RR and RL) wheels. The two circuits are independently formed in order to enable vehicle braking even in the event that one of the circuits fails.

A first spring 21b and a second spring 22b are provided in the first piston 21a and the second piston 22a of the master cylinder 20. The first spring 21b and the second spring 22b store an elastic force, when the first piston 21a and the second piston 22a are compressed. The first and second pistons 21a and 22a are pushed by the elastic force and returned to the originals state, when a force pushing the first piston 21a is lower than the elastic force.

Meanwhile, the input load 12 to pressurize the first piston 21a of the master cylinder 20 closely contacts the first piston 21a and a gap between the master cylinder 20 and the input load 12 is thus not present. That is, the brake pedal 10 directly pressurizes the master cylinder 20 without a pedal free stroke region, when the brake pedal 10 is pressed.

The electric brake system for vehicles according to the present invention includes a pressure supplier 110 to receive a brake will of a driver from the pedal displacement sensor 11 to sense displacement of the brake pedal 10, a hydraulic control unit 120 to perform braking of wheels with a force generated by the pressure supplier 110, blocking valves 143 and 144 to control transfer of the hydraulic pressure from the master cylinder 20 to the wheel cylinder 40, and a simulator device 150 connected to the master cylinder 20 to supply a reaction force to the brake pedal 10.

The pressure supplier 110 includes a pressure chamber 111 having a predetermined area to receive and store an oil, a hydraulic piston 112 and a hydraulic spring 113 provided in the pressure chamber 111, a motor 114 to generate rotational force by an electric signal of the pedal displacement sensor 11, a ball-screw unit 115 including a screw 115a and a ball/nut 115b to convert rotational motion of the motor 114 into linear motion, and a hydraulic passage 116 to connect the reservoir 20 to the pressure chamber 111 to supply an oil to the pressure chamber 111. A signal sensed by the pedal displacement sensor 11 is transferred to the electronic control unit (ECU, not shown) and the electronic control unit controls valves provided in the motor 114 and the brake system according to one embodiment of the present invention described below. A control operation of a plurality of valves according to displacement of the brake pedal 10 will be described below.

As described above, the pressure chamber 111 is connected through the hydraulic passage 116 to the reservoir 20 and receives an oil from the reservoir 20. The pressure chamber 111 is provided with a hydraulic piston 112 and a hydraulic spring 113 to elastically support the same. The hydraulic piston 112 is connected to the screw 115a of the ball-screw unit 115 and pressurizes the pressure chamber 111 through linear motion of the screw 115a, and the hydraulic spring 113 returns the hydraulic piston 112 to the original position.

The motor 114 is an electric motor that generates rotational force through a signal input from the electronic control unit and generates rotational forces in forward and reverse directions by the electronic control unit. The ball-screw 115b of the ball-screw unit 115 converting the rotational force into the linear motion functions as a rotation shaft of the motor 114 and functions to linearly move the screw 115a. Although not illustrated, a spiral groove is formed on an outer circumference of the screw 115a and the ball-screw 115b is rotatably coupled to the spiral groove through a plurality of balls. That is, as described above, the hydraulic piston 112 is pressed through linear motion of the screw 115a to generate a hydraulic pressure.

According to the present invention, a check valve 117 is mounted on the hydraulic passage 116 to prevent reverse flow of a pressure of the pressure chamber 111. The check valve 117 functions to prevent reverse flow of the pressure of the pressure chamber 111 and the oil is absorbed and stored in the pressure chamber 111, when the hydraulic piston 112 returns.

Figure 3:
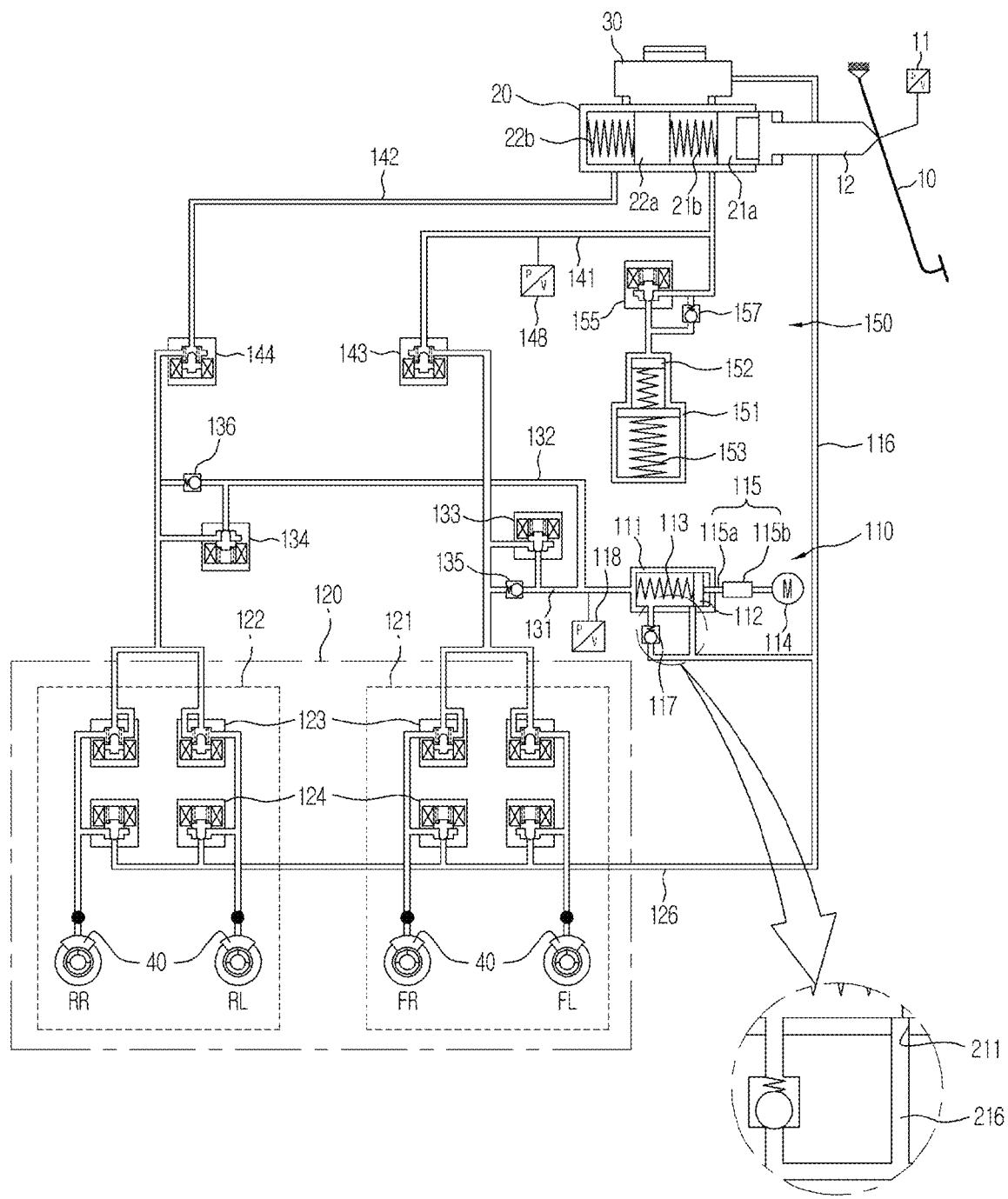
FIG. 3 is a hydraulic circuit view illustrating an electric brake system for vehicles according to another preferred embodiment of the present invention.

The electric brake system for vehicles having the pressure supplier 110 has a configuration to prevent failure of conversion of the inner pressure of the pressure chamber 111 into atmospheric pressure, when the pressure piston 112 is returned and the oil in the pressure chamber 111 is absorbed. For example, FIG. 3 illustrates an electric brake system for vehicles according to another embodiment of the present invention. Here, like reference numerals refer to like elements throughout.

In the present embodiment, the pressure chamber 111 is provided with a cut-off hole 211 and a connection passage 216 to connect the cut-off hole 211 to the hydraulic passage 116 is provided between the pressure chamber 111 and the hydraulic passage 116. The cut-off hole 211 is formed at a position corresponding to an initial position of the pressure piston 112. Accordingly, when the pressure piston 112 is returned, it is connected through the connection passage 216 to the reservoir 30 and the pressure is returned to atmospheric pressure.

Meanwhile, reference numeral '118' not illustrated is a first pressure sensor to sense a hydraulic pressure of the pressure chamber 111.

Referring to FIG. 1, the hydraulic control unit 120 includes a first circuit 121 to control at least one first vehicle wheel that receives a hydraulic pressure and performs braking, and a second circuit 122 to control at least one second vehicle wheel that receives a hydraulic pressure and performs braking, and thus has two brake circuits. The first vehicle wheel includes front vehicle (FR and FL) wheels and the second vehicle wheel includes rear vehicle (RR and RL) wheels. Each vehicle wheel (FR, FL, RR or RL) includes the wheel cylinder 40 and thus receives a hydraulic pressure and performs braking. That is, each circuit 121 or 122 includes a passage connected to the wheel cylinder 40 and a plurality of valves 123 and 124 to control the hydraulic pressure are mounted on the passage.

As shown in the drawing, the valves 123 and 124 are divided into a normally open type (hereinafter, referred to as a 'NO type') solenoid valve 123 disposed in a upper part of the wheel cylinder 40 to control transfer of the hydraulic pressure to the wheel cylinder and a normally close type (hereinafter, referred to as a 'NC type') solenoid valve 124 disposed in a lower part of the wheel cylinder 40 to control escape of the hydraulic pressure from the wheel cylinder 40. Open and close operations of the solenoid valves 123 and 124 are controlled by the electronic control unit.

In addition, the hydraulic control unit 120 includes a return passage 126 to connect the NC type solenoid valve 124 to the hydraulic passage 116. The return passage 126 discharges the hydraulic pressure transferred to the wheel cylinder 40 and transfers the same to the reservoir 30 or the pressure supplier 110.

The hydraulic control unit 120 according to one embodiment of the present invention includes first and second flow passages 131 and 132 to connect the pressure supplier 110 to circuits 121 and 122 of the hydraulic control unit 120. Further, a first conversion valve 133 is mounted in the first flow passage 131 to control transfer of oil to the wheel cylinder 40 of the first circuit 121 through an open/close operation, and a second conversion valve 134 is mounted in the second flow passage 132 to control transfer of oil to the wheel cylinder 40 of the second circuit 122 through an open/close operation. The second flow passage 132 branches from the first flow passage 131 and is connected to the second circuit 122. The open/close operation of the first and second conversion valves 133 and 134 is controlled by the electronic control unit and enables a hydraulic pressure generated in the pressure supplier 110 to be directly transferred to the wheel cylinder 40. That is, the first conversion valve 133 controls a hydraulic pressure supplied to the first circuit 121 and the second conversion valve 134 controls a hydraulic pressure supplied to the second circuit 122.

These first and second conversion valves 133 and 134 are provided as NC solenoid valves that are closed in a normal state, but open when receiving an open signal from the electronic control unit. Although not illustrated, the first conversion valve 133 is provided as an NO solenoid valve that is opened in a normal state, but closes, while receiving a close signal from the electronic control unit. That is, when the first conversion valve 133 is provided as an NO value, it opens without application of a power and thus easily operates.

Meanwhile, check valves 135 and 136 are disposed in parallel with the first and second conversion valves 133 and 134 disposed in a connection portion between the pressure chamber 111 and the respective circuits 121 and 122, respectively. The check valve includes a first check valve 135 disposed in parallel with the first conversion valve 133 and a second check valve 136 disposed in parallel with the second conversion valve 134. These check valves 135 and 136 are provided in one direction to transfer a hydraulic pressure to only the wheel cylinder 40, which function to prevent an increase in pressure caused by operation delay of the first and second conversion valves 133 and 134.

In one embodiment of the present invention, when an electric brake system for vehicles breaks down, the first back-up passage 141 and the second back-up passage 142 forming a passage may be provided between the master cylinder 20 having two hydraulic circuits and the wheel cylinder 40. A first blocking valve 143 to open or close the first back-up passage 141 is provided in the middle of the first back-up passage 141 and a second blocking valve 144 to open or close the second back-up passage 142 is provided in the middle of the second back-up passage 142. The first back-up passage 141 is connected through the first blocking valve 143 to the first circuit 121, and the second back-up passage 142 is connected through the second blocking valve 144 to the second circuit 122. In particular, a second pressure sensor 148 to measure a hydraulic pressure of the master cylinder 20 may be provided between the first blocking valve 143 and the master cylinder 20. The second pressure sensor senses blocking of the back-up passages 141 and 142 by the first blocking valve 143 and the second blocking valve 144 when a driver performs braking, and determines a brake will required by a driver.

The first and second blocking valves 143 and 144 are provided as NC solenoid valves that are opened in a normal state, but close while receiving a close signal from the electronic control unit.

In addition, a simulation device 150 connected to the master cylinder 20 is provided to supply a reaction force response to a pedal effort of the brake pedal 10. As shown in the drawing, a passage to connect the master cylinder 20 to the simulation device 150 is connected to the first back-up passage 141. This simulation device 150 includes a simulation chamber 151 to store oil discharged from an outlet of the master cylinder 20 and a simulation valve 155 provided in an inlet of the simulation chamber 151. The simulation chamber 151 includes a reaction force piston 152 and a reaction force spring 153 to elastically support the same and has a predetermined range of displacement through oil flowing in the simulation chamber 151. The simulation valve 155 is provided as an NC solenoid valve that is closed in a normal state and opens when a driver actuates a brake pedal 10 and transfers braking oil to the simulation chamber 151.

In addition, the simulation check valve 157 is provided between the simulation device 150 and the master cylinder 20, that is, between the simulation chamber 151 and the simulation valve 155, and the simulation check valve 157 is connected to the master cylinder 20. The simulation check valve 157 enables transfer of a pressure according to a pedal effort of the brake pedal 10 through only the simulation valve 155 to the simulation chamber 151.

Hereinafter, an operation of an electric brake system for vehicles according to a preferred embodiment of the present invention will be described in detail.

Figure 2:
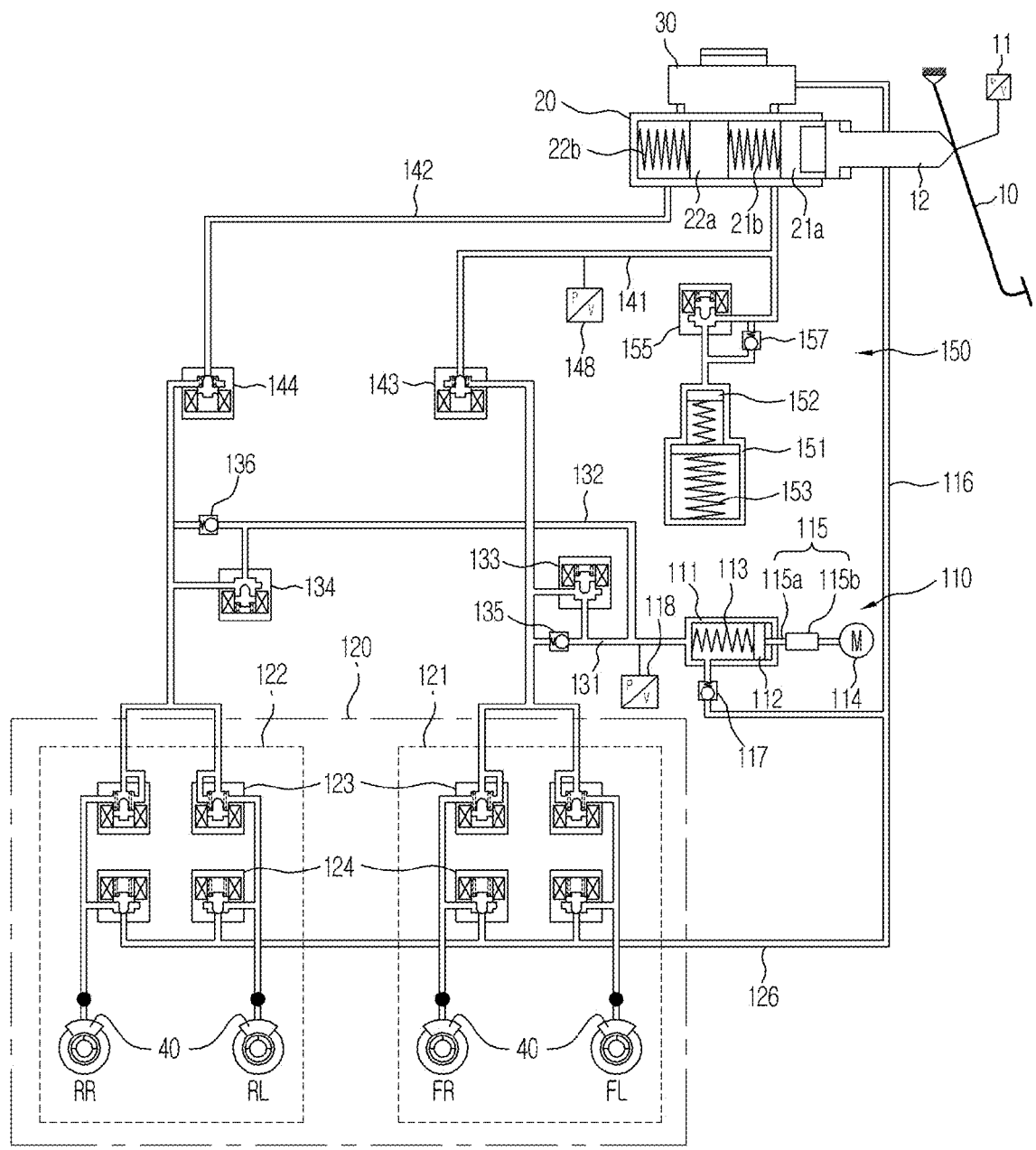
FIG. 2 is a hydraulic circuit view illustrating a normal operation of an electric brake system for vehicles according to one preferred embodiment of the present invention.

FIG. 2 is a hydraulic circuit view illustrating normal operation of an electric brake system for vehicles.

Referring to FIG. 2, when a driver starts braking, a pedal displacement sensor 11 senses a driver-requiring braking level through information such as pressure applied to the brake pedal 10 by the driver. An electronic control unit (not shown) receives an electric signal input from the pedal displacement sensor 11 and operates a motor 114. In addition, the electronic control unit may receive a regenerative braking level through a second pressure sensor 148 provided in an inlet of the master cylinder 20 and a first pressure sensor 118 provided in an inlet of the pressure supplier 110, calculate a frictional braking level depending on a difference between a driver-requiring braking level and a regenerative braking level and thus increase or decrease pressure applied to wheels.

Specifically, in an initial braking stage, when the driver actuates a brake pedal 10, the motor 114 operates and a rotational force of the motor 114 is converted into linear motion to pressurize the pressure chamber 111. The pressure chamber 111 is connected through the hydraulic passage 116 to the reservoir 30 and stores oil, and a hydraulic pressure is produced according to linear motion of the ball-screw unit 115, converting rotational motion into linear motion. In addition, the first and second blocking valves 143 and 144 disposed in the first and second back-up passages 141 and 142 connected to an outlet of the master cylinder 20 close to prevent transfer of hydraulic pressure produced in the master cylinder 20 to the wheel cylinder 40. The hydraulic pressure produced in the pressure chamber 111 is transfer through the first and second flow passages 131 and 132 to respective wheel cylinders 40. That is, the first and second conversion valves 133 and 134 are opened by the electronic control unit to control hydraulic pressures supplied to the first and second circuits 121 and 122 and therefore enable transfer of hydraulic pressure and generate a braking force.

Meanwhile, the pressure generated by pressurization of the master cylinder 20 according to a pedal effort of the brake pedal 10 is transferred to the simulation device 150 connected to the master cylinder 20. At this time, the NC type simulation valve 155 disposed between the master cylinder 20 and the simulation chamber 151 opens, a hydraulic pressure is supplied to the simulation chamber 151, the reaction force piston 152 moves, a pressure corresponding to a load of the reaction force spring 153 supporting the reaction force piston 152 is produced in the simulation chamber 151, and a suitable pedal feel is provided to the driver.

Next, an abnormal operation of an electric brake system for vehicles will be described in detail. Referring to FIG. 1, when the driver pressurizes a brake pedal 10, an input load 12 connected to the brake pedal 10 moves to the left and at the same time, the first piston 21a contacting the input load 12 also moves to the right. In this case, rapid braking is possible, since a gap is not present between the input load 12 and the first piston 21a. That is, hydraulic pressure generated by pressurization of the master cylinder 20 is transferred through the first and second backup passages 141 and 142 connected for backup braking to the wheel cylinder 40 to realize braking force. At this time, the first and second blocking valves 143 and 144 mounted on the first and second back-up passages 141 and 142 are provided as NO solenoid valves, and the simulation valve 155, and the first and second conversion valves 133 and 134 are provided as NC solenoid valves, to enable hydraulic pressure to be directly transferred to the wheel cylinder 40. As a result, stable braking is possible and braking stability is thus improved.

The electric brake system for vehicles senses a brake will of the driver according to a pedal effort of the brake pedal 10, controls the motor 114 through output of electrical signal, converts rotational motion of the motor 114 into linear motion to generate a hydraulic pressure and thereby enables accurate control of hydraulic pressure. In addition, when the brake system breaks down, a braking hydraulic pressure generated by pedal effort of the driver is directly transferred to the wheel cylinder 40 through the back-up passages 141 and 142 and braking stability is thus improved.

The electric brake system for vehicles according to the embodiments of the present invention has the following advantages.

First, the electric brake system has a configuration, enabling conversion of rotational force of a motor into linear motion to generate a hydraulic pressure and thereby enables accurate pressure control and structural simplification, as compared to a conventional electric brake system.

Second, when a brake system breaks down, pedal effort of a driver is directly transferred to a master cylinder, enabling vehicle braking and providing stable braking force.

Third, a pedal feel transferred to the driver is stably maintained, although a pressure is arbitrarily controlled during braking.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is claimed:

1. An electric brake system for vehicles comprising a reservoir to store an oil, a master cylinder having two hydraulic circuits to generate a hydraulic pressure using the oil stored in the reservoir, an input load contacting the master cylinder and being disposed to move forward by a pedal effort of a driver, and a pedal displacement sensor to sense displacement of a brake pedal connected to the input load, the electric brake system further comprising:
    a pressure supplier connected to the reservoir through a hydraulic passage to receive the oil, the pressure supplier outputting a brake will of a driver as an electric signal through the pedal displacement sensor, when the driver pushes the brake pedal, to operate a motor and convert a rotational force of the motor into linear motion;
    a hydraulic control unit comprising a first circuit including at least one first vehicle wheel and a second circuit including at least one second vehicle wheel to receive a hydraulic pressure with a force generated by the pressure supplier and thereby perform braking;
    a blocking valve to control the hydraulic pressure from the master cylinder to a wheel cylinder disposed in each vehicle wheel;
    a simulation device connected to the master cylinder, to provide a reaction force response to the pedal effort of the brake pedal;
    an electronic control unit to control the motor and valves, based on pressure information and pedal displacement information;
    a first flow passage to connect the pressure supplier to the first circuit and a second flow passage connected to the second circuit;
    a first conversion valve mounted in the first flow passage and configured to control a hydraulic pressure and a second conversion valve mounted in the second flow passage and configured to control a hydraulic pressure; and
    one or more check valves configured to transfer the hydraulic pressures to only the wheel cylinders and disposed in parallel with the first and second conversion valves, respectively, to prevent pressure increase caused by operation delay of at least one of the first and second conversion valves.

2. The electric brake system according to claim 1, wherein the pressure supplier comprises:
    a pressure chamber connected to the hydraulic passage to receive the oil; a hydraulic piston provided in the pressure chamber;
    a hydraulic spring provided in the pressure chamber to elastically support the hydraulic piston;
    the motor generates the rotational force by the electric signal of the pedal displacement sensor; and
    a ball-screw member including a screw and a ball nut to convert the rotational motion of the motor into the linear motion,
    wherein the hydraulic piston is connected to the linearly moving screw to pressurize the oil present in the pressure chamber through the screw.

3. The electric brake system according to claim 2, wherein the hydraulic passage comprises a check valve to prevent reverse flow of the pressure of the pressure chamber, and to enable the oil to be absorbed and stored in the pressure chamber, when the hydraulic piston is returned.

4. The electric brake system according to claim 2, wherein the pressure chamber comprises a cut-off hole, and a connection passage to connect the cut-off hole to the hydraulic passage is provided between the pressure chamber and the hydraulic passage.

5. The electric brake system according to claim 1, wherein the second flow passage branches from the first flow passage.

6. The electric brake system according to claim 5, wherein the first and second conversion valves are normal close type solenoid valves that are closed in a normal state and open when receiving an open signal from the electronic control unit.

7. The electric brake system according to claim 1, wherein the hydraulic control unit comprises:
    a normal open type solenoid valve disposed in an upper part of each wheel cylinder to control transfer of the hydraulic pressure to each wheel cylinder;
    a normal close type solenoid valve disposed in a lower part of each wheel cylinder to control escape of the hydraulic pressure from each wheel cylinder; and
    a return passage to connect the normal close type solenoid valve to the hydraulic passage.

8. The electric brake system according to claim 1, wherein first and second back-up passages to connect the two hydraulic circuits of the master cylinder to each wheel cylinder are provided in order to control the oil when the electric brake system for vehicles abnormally operates, and the blocking valve comprises:
    a first blocking valve mounted in the first back-up passage to control connection to the master cylinder; and
    a second blocking valve mounted in the second back-up passage to control connection to the master cylinder.

9. The electric brake system according to claim 8, wherein the first and second blocking valves are provided as normal open type solenoid valves that are opened in a normal state and close while receiving a close signal from the electronic control unit.

10. The electric brake system according to claim 9, wherein the simulation device is provided as a normal close type solenoid valve that is closed in a normal state and opens while receiving an open signal from the electronic control unit.

11. The electric brake system according to claim 1, wherein the simulation device comprises:
    a simulation chamber to store an oil discharged from the master cylinder;
    a reaction force piston provided in the simulation chamber;
    a reaction force spring to elastically support the reaction force piston; and
    a simulation valve provided in an inlet of the simulation chamber.

12. An electric brake system for vehicles comprising a reservoir to store an oil, a master cylinder having two hydraulic circuits to generate a hydraulic pressure using the oil stored in the reservoir, an input load contacting the master cylinder and being disposed to move forward by a pedal effort of a driver, and a pedal displacement sensor to sense displacement of a brake pedal connected to the input load, the electric brake system further comprising:

- a pressure supplier connected to the reservoir through a hydraulic passage to receive the oil, the pressure supplier outputting a brake will of a driver as an electric signal through the pedal displacement sensor, when the driver pushes the brake pedal, to operate a motor and convert a rotational force of the motor into linear motion;
- a hydraulic control unit comprising a first circuit including at least one first vehicle wheel and a second circuit including at least one second vehicle wheel to receive a hydraulic pressure with a force generated by the pressure supplier and thereby perform braking;
- a blocking valve to control the hydraulic pressure from the master cylinder to a wheel cylinder disposed in each vehicle wheel;
- a simulation device connected to the master cylinder, to provide a reaction force response to the pedal effort of the brake pedal;
- an electronic control unit to control the motor and valves, based on pressure information and pedal displacement information,
- wherein the pressure supplier comprises:
  - a pressure chamber connected to the hydraulic passage to receive the oil; a hydraulic piston provided in the pressure chamber;
  - a hydraulic spring provided in the pressure chamber to elastically support the hydraulic piston;
  - the motor generates the rotational force by the electric signal of the pedal displacement sensor; and
  - a ball-screw member including a screw and a ball nut to convert the rotational motion of the motor into the linear motion,
  - wherein the hydraulic piston is connected to the linearly moving screw to pressurize the oil present in the pressure chamber through the screw,
- wherein the pressure chamber comprises a cut-off hole, and a connection passage to connect the cut-off hole to the hydraulic passage is provided between the pressure chamber and the hydraulic passage.

13. The electric brake system of claim 12, wherein the hydraulic passage comprises a check valve to prevent reverse flow of the pressure of the pressure chamber, and to enable the oil to be absorbed and stored in the pressure chamber, when the hydraulic piston is returned.

14. The electric brake system of claim 12, further comprising:
- a first flow passage to connect the pressure supplier to the first circuit and a second flow passage branching from the first flow passage and being connected to the second circuit; and
- a first conversion valve mounted in the first flow passage to control a hydraulic pressure and a second conversion valve mounted in the second flow passage to control a hydraulic pressure.

15. The electric brake system of claim 14, wherein check valves are disposed in parallel with the first and second conversion valves, respectively.

16. The electric brake system according to claim 14, wherein the first and second conversion valves are normal close type solenoid valves that are closed in a normal state and open when receiving an open signal from the electronic control unit.

17. The electric brake system of claim 12, wherein the hydraulic control unit comprises:
- a normal open type solenoid valve disposed in an upper part of each wheel cylinder to control transfer of the hydraulic pressure to each wheel cylinder;
- a normal close type solenoid valve disposed in a lower part of each wheel cylinder to control escape of the hydraulic pressure from each wheel cylinder; and
- a return passage to connect the normal close type solenoid valve to the hydraulic passage.

18. The electric brake system of claim 12, wherein first and second back-up passages to connect the two hydraulic circuits of the master cylinder to each wheel cylinder are provided in order to control the oil when the electric brake system for vehicles abnormally operates, and the blocking valve comprises:
- a first blocking valve mounted in the first back-up passage to control connection to the master cylinder; and
- a second blocking valve mounted in the second back-up passage to control connection to the master cylinder.

19. The electric brake system of claim 18, wherein the first and second blocking valves are provided as normal open type solenoid valves that are opened in a normal state and close while receiving a close signal from the electronic control unit.

20. The electric brake system of claim 19, wherein the simulation device is provided as a normal close type solenoid valve that is closed in a normal state and opens while receiving an open signal from the electronic control unit.

21. The electric brake system of claim 12, wherein the simulation device comprises:
- a simulation chamber to store an oil discharged from the master cylinder;
- a reaction force piston provided in the simulation chamber;
- a reaction force spring to elastically support the reaction force piston; and
- a simulation valve provided in an inlet of the simulation chamber.

* * * * *